United States Patent
Find et al.

(10) Patent No.: US 8,652,236 B2
(45) Date of Patent: *Feb. 18, 2014

(54) METHOD FOR RECOVERY OF HIGH PURITY CARBON DIOXIDE

(75) Inventors: Rasmus Find, Vejle (DK); Svend Geleff, Rødding (DK); Maj Toft Andersen, Lunderskov (DK)

(73) Assignee: Union Engineering A/S, Fredericia (DK)

( * ) Notice: Subject to any disclaimer, the term of this patent is extended or adjusted under 35 U.S.C. 154(b) by 1147 days.

This patent is subject to a terminal disclaimer.

(21) Appl. No.: 12/523,698

(22) PCT Filed: Jan. 16, 2008

(86) PCT No.: PCT/DK2008/050008
§ 371 (c)(1),
(2), (4) Date: Sep. 17, 2009

(87) PCT Pub. No.: WO2008/086812
PCT Pub. Date: Jul. 24, 2008

(65) Prior Publication Data
US 2010/0101415 A1 Apr. 29, 2010

(30) Foreign Application Priority Data
Jan. 17, 2007 (DK) .................... 2007 00071

(51) Int. Cl.
*B01D 53/14* (2006.01)
(52) U.S. Cl.
USPC .................. 95/160; 95/161; 95/163; 95/172; 95/173; 95/174; 95/178; 95/183; 95/232; 95/236; 423/228; 423/235
(58) Field of Classification Search
None
See application file for complete search history.

(56) References Cited

U.S. PATENT DOCUMENTS

| 3,266,220 A * | 8/1966 | Woertz .................... 95/177 |
| 5,832,712 A | 11/1998 | Ronning et al. |
| 6,146,603 A | 11/2000 | Chakravarti et al. |
| 6,174,506 B1 | 1/2001 | Chakravarti et al. |
| 7,829,049 B2 * | 11/2010 | Find et al. ............... 423/228 |
| 2006/0266214 A1* | 11/2006 | Won .................... 95/234 |
| 2007/0148069 A1 | 6/2007 | Chakravarti et al. |
| 2008/0025893 A1 | 1/2008 | Asprion et al. |
| 2010/0092359 A1* | 4/2010 | Svendsen et al. ........... 423/230 |
| 2010/0101415 A1* | 4/2010 | Find et al. ............... 95/161 |

FOREIGN PATENT DOCUMENTS

| CA | 2557911 A1 | 3/2005 |
| EP | 1 059 110 A1 | 12/2000 |
| EP | 1 061 045 A1 | 12/2000 |
| JP | 2007/253104 A | 10/2007 |
| WO | 2005087349 A1 | 9/2005 |
| WO | 2005087350 A1 | 9/2005 |
| WO | 2007/075399 A1 | 7/2007 |

* cited by examiner

*Primary Examiner* — Duane Smith
*Assistant Examiner* — Pankti Patel
(74) *Attorney, Agent, or Firm* — Browdy and Neimark, PLLC (57) ABSTRACT

The present invention describes a method for recovery of high purity carbon dioxide, which is substantially free of nitrogen oxides. This high purity carbon dioxide is obtained by introducing into the method a step in which carbon dioxide absorbed in an absorbing agent is flashed. The present invention also discloses a plant for recovery of said high purity carbon dioxide comprising an absorption column, a flash column, a stripper column, and a down stream purification unit comprising a washing column, a dehydrator, a condenser and a distillation unit.

19 Claims, 2 Drawing Sheets

With Flash Column 2

FIGURE 1
With Flash Column 2

FIGURE 2 (Prior Art)
Without Flash Column 2

METHOD FOR RECOVERY OF HIGH PURITY CARBON DIOXIDE

The present invention relates to a method for recovery of high purity carbon dioxide from a gaseous source and uses thereof. More specifically, the present invention relates to the production of high purity carbon dioxide, which is substantially free of nitrogen oxides, sulphurous compounds and volatile organic contaminants. The present invention also relates to a plant for the recovery of high purity carbon dioxide from a gas and the use of said high purity carbon dioxide in foodstuffs.

BACKGROUND OF THE INVENTION

Carbon dioxide is a well-known gas, which is present in the atmosphere. It is released to the atmosphere in large amounts by fermentation processes, limestone calcinations, and all forms of combustion processes of carbon and carbon compounds. In the recent decades, the attention in respect of said emission has been rising, because of the environmental problem due to future climate change via Greenhouse effect. Consequently, extensive work has been performed over the years in order to develop processes for the removal of carbon dioxide from combustion gases. If possible, a subsequent recovery of carbon dioxide may make those processes economical feasible.

One type of conventional methods for the recovery of carbon dioxide from a gaseous source is the absorption method, in which carbon dioxide is absorbed in an absorbing agent. If other gases, such as oxygen, are present in the gaseous source, said other gases may also be absorbed chemically and/or physically. This will be the case if an amine-based agent is used as the absorbing agent.

It is well-known from the prior art that when $O_2$ is present in the carbon dioxide-containing gaseous source and when alkanolamine is used as the absorbing agent, said $O_2$ will be transferred into the alkanolamine-containing absorbing agent during the absorption procedure. As a consequence an unwanted degradation of alkanolamine as well as corrosion problems will occur due to the presence of $O_2$.

Many prior art documents relate to this problem. EP 1 059 110 discloses a system for recovering absorbate such as carbon dioxide using an alkanolamine absorbent fluid, wherein the loaded absorbent is heated in a two step heating procedure prior to the separation of the absorbate from the absorbent, and wherein the loaded absorbent is deoxygenated after the first heating step and prior to the second heating step. The deoxygenation takes place by means of depressurisation.

In EP 1 061 045 a system for recovering absorbate such as carbon dioxide from an oxygen-containing mixture is described, wherein carbon dioxide is concentrated in an alkanolamine-containing absorption fluid, oxygen is separated from the absorption fluid, and carbon dioxide is steam stripped from the absorption fluid and recovered. In this system, the oxygen is separated from the absorption fluid by passing the carbon dioxide loaded absorbent comprising dissolved oxygen in countercurrent mass transfer contact with oxygen scavenging gas.

In other cases nitrogen oxides (also named NOx), sulphurous compounds and volatile organics may be present as contaminants in addition to $O_2$ in the gaseous source. These contaminants will also be absorbed chemically and/or physically in the absorbing agent, when an amine-based agent is used as the absorbing agent.

In a conventional plant for production of high purity carbon dioxide, the carbon dioxide is firstly absorbed in an absorbing agent and afterwards the carbon dioxide and the absorbing agent is separated in a stripper column. However, part of the contaminants present in the feed gas is absorbed together with carbon dioxide during the absorption step. When separating the carbon dioxide from the absorbing agent in a subsequent stripper process, part of the absorbed contaminants will also be released in the stripper off gas together with the carbon dioxide. The stripper off gas will further contain $N_2$ and $O_2$ in some amounts.

When producing food grade carbon dioxide or other carbon dioxide applications, where a high purity is required, these contaminants must be removed from the stripper off gas in down stream equipment in order to obtain the required purity. Conventional technology available for removing such contaminants includes scrubbing, oxidation, adsorption and distillation.

The first step of the down stream purification of the stripper off gas is most often an oxidation process. In this oxidation step any NOx's present is oxidised to nitrate, which subsequently may be removed as a liquid phase. Furthermore, if sulphur is present as hydrogen sulphide, this compound is oxidised to free sulphur. Unfortunately, this oxidation requires a large demand of chemicals. Various oxidation agents may be used. In particular, potassium permanganate is widely used. However, this particular chemical is highly hazardous and, furthermore, as potassium permanganate may be used for the production of explosives it is to be expected that commercial use of this chemical at some point may be forbidden.

In the next step of the down stream purification the carbon dioxide containing gas is passed to a dehydrator. In this dehydrator any water present in the gas is absorbed and thereby removed from the gas stream. However, if any residues of acetaldehyde and/or volatile oxygenates are present in the gas these compounds are also removed in the dehydrator.

In the last step of the down stream purification the gaseous carbon dioxide is liquefied in a condenser. In the condenser it is possible to remove any residues of NO, which may still be present. This, however, is not the case for any residues of $NO_2$. In fact if any $NO_2$ is present when the gas reaches the condenser, or if any $NO_2$ is produced inside of the condenser as for example due to oxidation of NO, said $NO_2$ will be transferred to the liquid phase in the condenser and is subsequently almost impossible to remove.

Hence, an object of the present invention is to provide a method for the recovery of high purity carbon dioxide, which is substantially free of contaminants, wherein the oxidation step in the down stream purification is not required.

In the presently pending international patent application PCT/DK2006/000417 the present inventors found that by introducing a flash column between the absorption column and the stripper column the content of NOx in the stripper off gas can be markedly reduced, when an alkanolamine is used as the absorption agent.

Surprisingly, it has now been found that in addition to NOx's also sulphurous compounds and volatile organic contaminants can be efficiently removed in the flash column irrespective of the type of absorption agent chosen for the performance of the absorption of carbon dioxide in the absorption column.

Hence, by introducing this flash column several beneficial effects are obtained.

First of all, the content of contaminants in the stripper off gas is so low that the subsequent oxidation is no longer required. Hence, the consumption of chemicals is reduced and no subsequent disposal of these used chemicals is necessary.

Secondly, substantially no $NO_2$ is present in the liquid carbon dioxide phase leaving the condenser. This is due to the fact that as almost all $O_2$ has been removed in the flash column, the chemical equilibrium $NO+\frac{1}{2}O_2 <-> NO_2$, will shift to the left to form mainly NO. Therefore, no $NO_2$ is present in the gas, when the gas later on enters the condenser. Furthermore, no $NO_2$ is produced in the condenser because of the very low content of $O_2$ in the gas. Hence, substantially no $NO_2$ can be found in the liquid carbon dioxide product.

Thirdly, it has been found that the energy consumption for operating the condenser is markedly reduced. This effect is considered to be due to the fact that the very low content of contaminants in the gas phase will increase the overall heat transfer coefficient as well as the dew point temperature compared to conventional plants. This leads to higher suction pressure for the refrigeration compressors for the condensation process, which also leads to a reduced energy requirement for the condensation.

Fourthly, the product yield is increased because the loss of gaseous carbon dioxide in the condenser is markedly lowered as compared to conventional plants for production of high purity carbon dioxide.

DESCRIPTION OF THE INVENTION

In one aspect the present invention relates to a method for recovery of high purity carbon dioxide from a gaseous source, where said high purity carbon dioxide is substantially free of contaminants, for example nitrogen oxides sulphurous compounds and volatile organic compounds.

The method according to the present invention comprises the steps of:

a. feeding a gas comprising carbon dioxide, oxygen, $N_2$, nitrogen oxides, and optionally sulphurous compounds and volatile organic contaminants into an absorption column, b. absorbing the gas in an absorbing agent, by which the gas is separated into a carbon dioxide-lean gas and a carbon dioxide-rich liquid, c. pressurising and heating the liquid obtained in step, d. separating by means of flashing the liquid obtained in step c into a $N_2$-, NOx- and oxygen-rich gas and a $N_2$-, NOx- and oxygen-depleted liquid leaving the flash column, e. pressurising the liquid leaving the flash column in step d, f. separating the liquid obtained in step e into a carbon dioxide-rich stripper off gas and a carbon dioxide-depleted liquid by means of stripping in a stripper column, g. cooling the stripper off gas obtained in step f.

In another aspect the present invention relates to a method for recovery of high purity carbon dioxide from a gaseous source, where said high purity carbon dioxide is substantially free of nitrogen oxides.

The method according to the second aspect of the present invention comprises the steps of:

a. feeding a gas comprising carbon dioxide, oxygen, $N_2$, nitrogen oxides, b. absorbing the gas in an absorbing agent, by which the gas is separated into a carbon dioxide-lean gas and a carbon dioxide-rich liquid, c. pressurising and heating the liquid obtained in step b, d. separating by means of flashing the liquid obtained in step c into a $N_2$-, NOx- and oxygen-rich gas and a $N_2$-, NOx- and oxygen-depleted liquid leaving the flash column, e. pressurising the liquid leaving the flash column in step d, f. separating the liquid obtained in step e into a carbon dioxide-rich stripper off gas and a carbon dioxide-depleted liquid by means of stripping in a stripper column, g. cooling the stripper off gas obtained in step f, i. pressurising and cooling the gas obtained in step g, j. dehydrating the gas obtained in step i by means of a dehydrator and thereby providing a dry gas substantially free of water, and The following detailed description applies equally to the different aspects of the present invention. The particular embodiments also apply equally to each of the aspects of the invention.

In principle, any kind of gas comprising carbon dioxide, oxygen, $N_2$, nitrogen oxides and optionally sulphurous compounds and organic contaminants may be applied in the process. In a preferred embodiment, however, the feeding gas is flue gas.

In the absorption steps (step b) any absorbing agent capable of absorbing carbon dioxide either chemical or physical absorbing agents may be applied. As examples of physical absorbing agents selexol, methanol, purisol, genosorb or morphysorb can be mentioned. As examples of chemical absorbing agents any amine-based absorbing agent can be mentioned. By the term "amine-based" absorbing agent is meant any agent, in which an amine group is incorporated as for example alkanolamines, such as monoethanolamine, diethanolamine, diisopropanolamine, methyldiethanolamine and triethanolamine, amino-alcohols, such as amino-diethylene-glycol, and amino acids and amino acids salts and derivatives thereof. Preferably, an amine-based absorbing agent is used. Other suitable absorbing agents are those mentioned in WO 2005087349 and WO 2005087350.

Most often the absorbing agent is an aqueous solution of one of the above-mentioned amine-based agents. However, mixtures comprising two or more of the listed agents in any mixing ratio may also be used in the method according to the present invention. It is within the skills of a practitioner to determine the optimal amount and composition of the absorbing agent in order to achieve a suitable absorption procedure.

The liquid leaving the absorption column is then heated and pressurised to a pressure higher than or equal to the pressure of the liquid leaving the absorber. The purpose of the pressurization is primarily to facilitate the transport of the liquid. It is within the knowledge of a skilled person to perform such processes.

As explained above, the introduction of the flashing steps (steps d) in the method of the present invention makes it possible to produce a stripper off gas, which is substantially free of oxygen, and only contains traces of nitrogen oxides. However, in order to achieve this beneficial effect the flash column must operate at a higher temperature and a pressure, which is higher than or close to the equilibrium conditions of the liquid stream leaving the absorption column. Under such conditions, the liquid entering the flash column will be unsaturated and the release of non-saturated components is possible. Hence, due to the new equilibrium conditions substantially all $O_2$ and the main part of NOx will be removed from the flash column in the gas stream, and therefore never reach the stripper column.

In a preferred embodiment the temperature of the liquid obtained in step c is in the range of 70° C. to 140° C., more preferred in the range of 90° C. to 120° C., and most preferred in the range of 95° C. to 110° C., and the pressure of said liquid is in the range of 0.1 bar to 3 bar, more preferred in the range of 0.2 to 2 bar, and most preferred in the range of 1 bar to 2 bar. Operating outside these ranges is normally not economically feasible. A person skilled in the art will know how to perform such pressurising and heating procedures.

The gas obtained in steps d, which comprises a significant amount of carbon dioxide in addition to oxygen, $N_2$, nitrogen oxides and optionally water, sulphurous compounds and volatile organic compounds, may be recycled to the absorption column in order for a second recovery procedure of the carbon dioxide. Alternatively, the said gas may be disposed of.

The liquid leaving the flash column is pressurised to a pressure that is higher than or equal to the pressure of the liquid leaving the flash column before entering the stripper column. A person skilled in the art will know how to perform such a pressurisation.

In the stripper column the pressurised liquid from the flashing column is separated into a carbon dioxide-rich gas and a carbon dioxide-depleted liquid. As mentioned above, due to the removal of oxygen and nitrogen oxides in the flash column, the $O_2$ and NOx content will be reduced dramatically in the stripper off gas stream. Because of the reduced amount of NOx and the very limited amount of $O_2$ in the stripper off gas, the equilibrium reaction: $NO+\frac{1}{2}O_2 <-> NO_2$, will shift to the left to form mainly NO.

The liquid obtained in steps f, which mainly comprises the absorbing agent, optionally an aqueous solution of the absorbing agent, may be recycled and mixed with the absorbing agent used for absorbing the gas in step b. However, before entering the absorption column, an adjustment of the temperature and/or the pressure of said liquid may be required.

The gas leaving the stripper column is then subjected to a downstream purification treatment. However, in certain circumstances the stripper off gas may be of such high purity that the subsequent purification is not necessary.

In one embodiment the gas leaving the stripper is cooled and then fed into a washing column. In this column any contaminants soluble in the washing liquid can be removed from the gas. A preferred washing liquid is water, due to the low solubility of carbon dioxide in water. A person skilled in the art would know how to perform such a washing step.

Particularly, when using aqueous solutions as an absorbent part of the gaseous water in the stripper off gas may be condensed in the cooling step, recycled and optionally mixed with the liquid entering the flash column or elsewhere in the upstream process. Hence, by introducing this recirculation an adjustment of the water balance is achieved minimizing the need for an external water supply The gas leaving the washing column is now substantially free of any soluble contaminants, such as absorbent.

The gas is pressurised and cooled before the gas is entering the dehydrator. Hereby the water content is reduced. This pressurisation may be performed in one or more compression steps e.g. 1, 2 or 3 or even more.

In cases where no washing step is included in the method, the stripper off gas may in an embodiment be cooled and pressurised before entering the dehydrator. Alternatively, the dehydration may be performed prior to compression or during compression. It is within the knowledge of a skilled person to perform these pressure and temperature regulations.

In the dehydration unit water is removed. Particularly when using adsorption, oxygenates and volatile organics can effectively be removed. Examples of oxygenates, which can be removed, are acetaldehyde and methanol. A practitioner would know how a conventional dehydration unit operates In a particular embodiment the gas leaving the stripper column is fed directly to the dehydrator without a washing step. In another embodiment the gas is subjected to the washing step before fed to the dehydrator.

The dry gas then enters the condenser, in which the gas is separated into a carbon dioxide-rich liquid and a gaseous mixture of carbon dioxide and non-condensable gases, e.g. NO, $N_2$, $O_2$. The gas entering the condenser is substantially free of $NO_2$. Because of the introduction of the flash column between the absorption column and the stripper column, almost all $O_2$ and a main part of NOx are removed from the gas stream. Consequently, the chemical equilibrium: $NO+\frac{1}{2}O_2<->NO_2$, is shifted far to the left, and the traces of any NOx present will mainly be in the form of NO. This is still true when the gas enters the condenser. Hence, practically no contaminating $NO_2$ is present in the gas and no $NO_2$ can be transferred to the liquid phase of condensed carbon dioxide, from which it is very difficult to remove.

Furthermore, because of the very low content of any contaminants it has been found that the overall heat transfer coefficient is increased and the dew point temperature is raised for the gas as compared to conventional plants for carbon dioxide recovering. Therefore, the energy requirement for operating the condenser is reduced. Additionally, the suction pressure for refrigeration compressors for the condensation process is increased because of the low content of contaminants, making the mode of operation more efficient.

In the condenser, part of the gaseous carbon dioxide is liquefied. The amount of condensed carbon dioxide is determined by the temperature and the pressure according to thermodynamic rules. However, in the condenser it is necessary to continuously relieving some of the gas in order to prevent a build up of the contaminants. Consequently, some of the gaseous carbon dioxide will also be discharged. However, the less contaminants entering the condenser, the less is the requirement for relieving gases from the condenser. As a result the product yield is increased, when comparing the plant according to the present invention with a conventional plant.

It is within the skills of an ordinary practitioner to determine the optimal conditions for operating the condenser.

The liquid leaving the condenser may subsequently enter a distillation column. This distillation step is optional and whether this step is necessary will depend on the purity of the carbon dioxide obtained in the condenser. During the distillation any traces of NO present in the liquid is distilled off. Hence, the produced liquid carbon dioxide is of very high purity.

Optionally, the liquid leaving the distillation column may enter a reboiler before the liquid carbon dioxide is entered into a storage tank. By introducing a reboiler in connection with the distillation column a product carbon dioxide of higher purity is obtainable.

In an alternative embodiment the gas from the dehydrator unit is fed directly to the bottom of the distillation column thus omitting the reboiler.

How to design and operate such a distillation column optionally together with a reboiler lies within the knowledge of a skilled person.

As mentioned above a further advantage of one method according to the present invention is that the step of oxidising the stripper off gas is not necessary. Hence, the use of hazardous chemicals is avoided.

Yet another aspect of the present invention relates to the use of any of the methods according to the invention for the production of high purity carbon dioxide. The purity of the carbon dioxide product is preferably of food grade quality or suitable for enhanced oil recovery (EOR) or sequestration, and thus usable as a component in any kind of foodstuff or oil industry. In a particular preferred embodiment the carbon dioxide produced according to the method of the invention is used as a component in soft drinks.

In yet another aspect a plant for recovery of high purity carbon dioxide is provided.

Such a plant comprises an absorption column having a gas outlet and a liquid outlet, said liquid outlet being connected to a flash column having a gas outlet and a liquid outlet, said liquid outlet being connected to a stripper column having a gas outlet and a liquid outlet, and where said gas outlet optionally is connected to a washing column. The optional washing column has a gas outlet and a liquid outlet, said optional gas outlet being connected to a dehydrator having a gas outlet, which is connected to a condenser having a gas outlet and a liquid outlet from which the produced liquid carbon dioxide is streaming to the storage tank.

In cases where the optional washing column is not present, the gas outlet of the stripper column is connected to the dehydrator.

In a preferred embodiment the liquid outlet of the condenser is connected to a distillation column having a liquid outlet from which the produced liquid carbon dioxide is streaming to the storage tank.

The absorption column to be used may be any column known in the art suitable for the performance of absorbing gaseous carbon dioxide into an absorbing agent. Examples of suitable absorption columns to be used are columns, which contain internals or mass transfer elements such as trays or random or structured packing.

The flash column may be any kind of flash distillation columns known in the art. Examples of suitable flash columns are columns, which contain internals or mass transfer elements such as trays or random or structured packing. A skilled person may easily determine whether one or more high pressure flash distillation column(s) or one or more low pressure distillation column(s) or a combination thereof is required in order to obtain a favourable result. It will also be within the knowledge of the skilled person to determine whether a desired result is best achieved by using only one column, or by using two or more columns connected in series or in parallel.

The stripper column to be used in the plant may be any packed column known in the art. Examples of suitable stripper columns are columns, which contain internals or mass transfer elements such as trays or random or structured packing.

The washing column may be any type of washing column known within the art. Preferably, the column to be used contains internals or mass transfer elements such as trays or random or structured packing in order to obtain a good distribution of the washing water and in order to obtain an optimal contact between the gas and the water.

The dehydrator is incorporated in order to remove water and other impurities from the gaseous stream. The process of dehydrating a gaseous stream is well-known in the art, and a suitable dehydrator to perform the dehydration is easily selected by the skilled person. As examples dehydration units TSA adsorber with molecular sieves and filters of active carbon particles can be mentioned. Other types of dehydrators include MEG or TEG units.

The condenser to be used in the plant may be any type of heat exchanger suitable for the condensation. A skilled person would know how to design the condenser taking into account the temperature, pressure and chemical composition of the gas entering the condenser.

The distillation column may be any kind of column known in the art suitable for distilling liquid carbon dioxide. It will be within the knowledge of the skilled person to determine whether a desired result is best achieved by using only one column, or by using two or more columns connected in series or in parallel. The most suitable distillation column to be used is normally packed columns with a low pressure-drop, but also trayed columns may be employed.

In a preferred embodiment the gas outlet of the flash column is connected to the absorption column. By this configuration the gas leaving the flash column may be recycled to the absorption column. This recirculation has the beneficial effect of providing a second recovery step of the carbon dioxide, which was transferred from the liquid phase to the gas phase during the flashing step and, hence, otherwise would have been lost.

In another preferred embodiment the liquid outlet of the stripper column is connected to the absorption column, which makes it possible to recycle the liquid leaving the stripper column. The beneficial effect of this recirculation is the reuse of absorbing agent, which otherwise would have to be disposed of.

In yet another preferred embodiment the gas outlet from the stripper, which is connected to the washing column is also connected to the flash column. In this embodiment the gaseous water is removed from the stripper off gas when the stripper off gas is cooled by means of condensation and the liquid water is then optionally recycled to the flash column. By this mode of operation it is possible to adjust the water balance in the plant.

In still another preferred embodiment the liquid outlet of the distillation column is connected to a reboiler in order to improve the purity of the product carbon dioxide.

It is within the standard procedure of a skilled person to calculate the numbers and sizes of each of the above-mentioned units of the plant when the mass flow, the chemical composition, the temperature, and the pressure of each stream is known in order to obtain the most feasible mode of operating the plant.

When selecting suitable materials for each of said units, special consideration must be directed to the temperature, the pressure, and the chemical and physical properties of the gases and liquids to be treated. Such considerations will be within the knowledge of a person skilled in the art. However, due to the low content of contaminants in the stripper off gas the down stream equipment is less exposed to attacks from critical chemicals (such as $O_2$ in EOR applications) as compared to conventional plants.

Furthermore, a skilled person can easily acknowledge that the selection and control of process parameters will depend on the chemical composition of the gas entering the plant as well as the chemical composition and physical condition of the gases and liquids in each step of the method. Calculations for determining the number and size of heat exchangers in order to minimize the energy consumption for heating and cooling are standard procedure for a person skilled in the art. Also the selection of units for increasing and decreasing the pressure of the gas and liquid streams lies within the working area of a skilled person.

Figure 1:
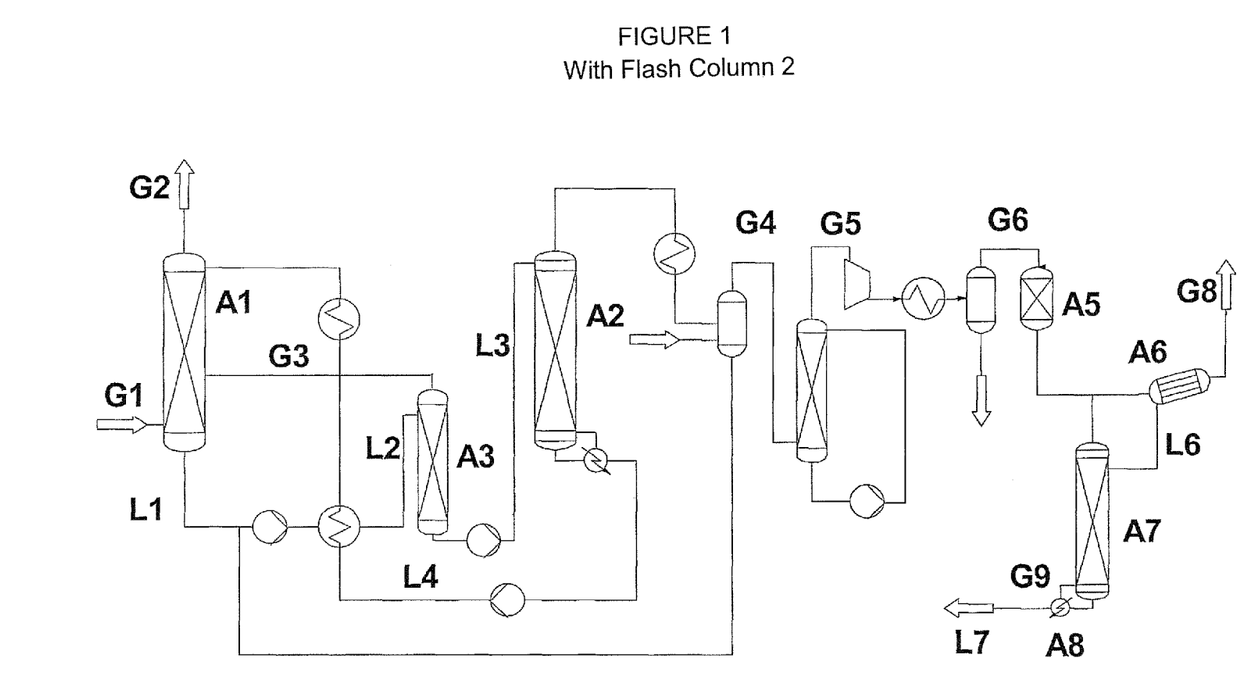
FIG. 1 is a schematic flow diagram for $CO_2$ recovery in a preferred embodiment of the present invention.
Figure 2:
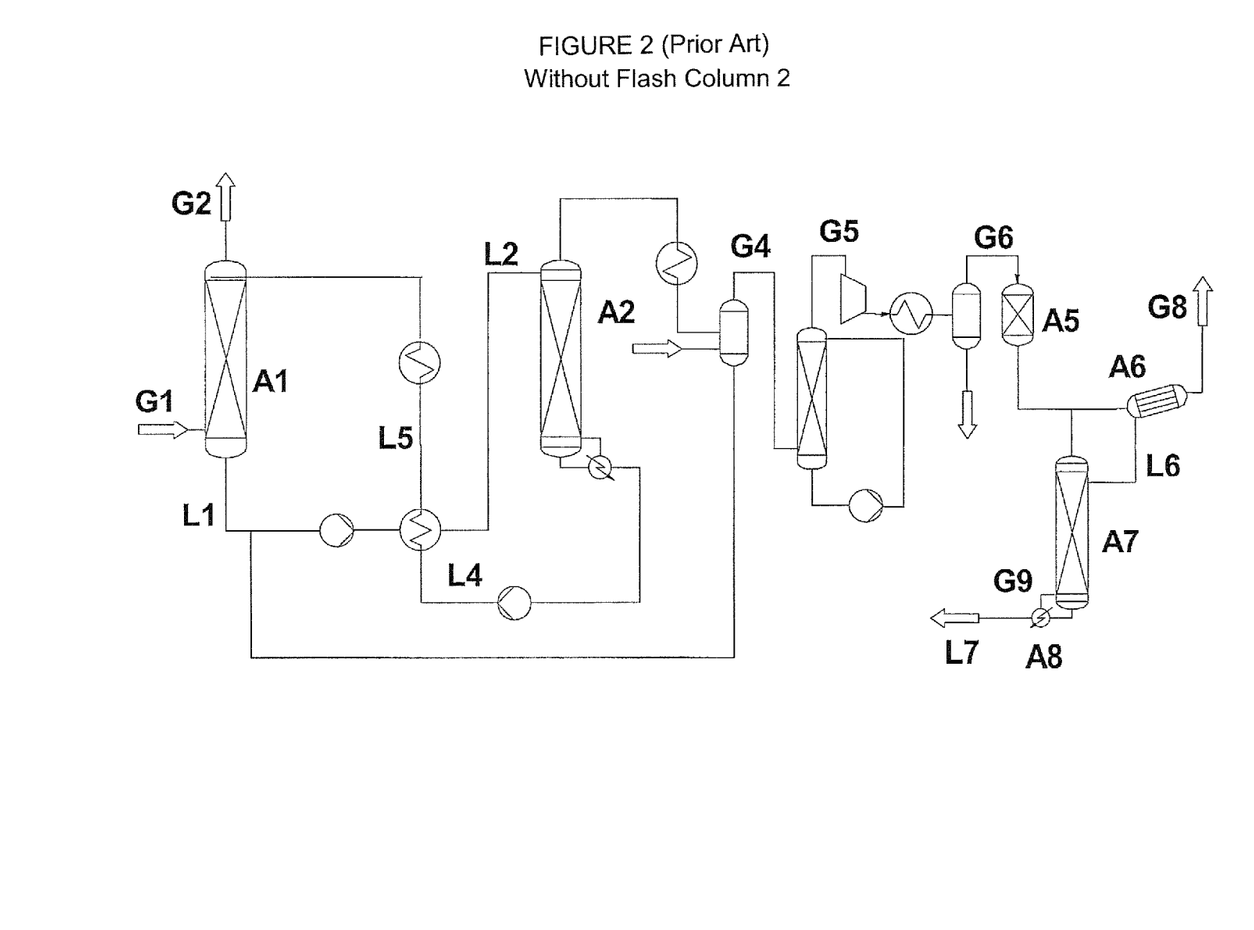
FIG. 2 is a schematic flow diagram for $CO_2$ recovery according to a conventional plant.

In the following the invention is described in more detail with reference to the at present most preferred embodiment, which is shown in FIG. 1 and with reference to a conventional plant, which is shown in FIG. 2. Said figures depict schematic flow diagrams for the $CO_2$ recovery.

EXAMPLE

For the at present most preferred embodiment, data with respect to pressure and temperature as well as the chemical composition of the interesting gas and liquid streams are given in the table below. All references to pressures are to the total pressure. All percentages and ppm specifications are based on mole fractions. For the data relating to the gas streams, the data specified are based on wet gases.

TABLE 1

Pressure, temperature and chemical composition of selected gas and liquid streams for the plant according to the present invention, in which a flash column is included.

|  | Pressure (bar) | Temp. (° C.) | $CO_2$ mole | $O_2$ mole | $NO_2$ mole | NO mole |
|---|---|---|---|---|---|---|
| Gas G1 entering the absorption column | 1.02 | 47 | 11% | 3.4% | 3 ppm | 100 ppm |
| Gas G2 leaving the absorption column | 1.02 | 43 | 600 ppm | 3.8% | <1 ppm | 115 ppm |
| Liquid L1 leaving the absorption column | 1.02 | 48 | 1.3% | <1 ppm | <1 ppm | <1 ppm |
| Liquid L2 entering the flash column | 3 | 95 | 1.2% | <1 ppm | <1 ppm | <1 ppm |
| Gas G3 leaving the flash column | 1.3 | 94 | 38% | 420 ppm | <1 ppm | 110 ppm |
| Liquid L3 entering the stripper | 3 | 94 | 1.2% | <1 ppm | <1 ppm | <1 ppm |
| Liquid L4 after the stripper | 2 | 112 | 0.6% | <1 ppm | <1 ppm | <1 ppm |
| Liquid L5 before the absorption column | 2 | 63 | 0.6% | <1 ppm | <1 ppm | <1 ppm |
| Gas G4 leaving the stripper after cooling | 1.2 | 45 | 92% | 1 ppm | <1 ppm | <1 ppm |
| Gas G5 leaving the washing column | 1.2 | 45 | 92% | 1 ppm | <1 ppm | <1 ppm |
| Gas G6 entering the dehydrator | 17 | 20 | 99.9% | 1 ppm | <1 ppm | <1 ppm |
| Gas G7 entering the condenser | 17 | 20 | ~100% | 1 ppm | <1 ppm | <1 ppm |
| Gas G8 leaving the condenser | 17 | −24 | ~100% | 20 ppm | <1 ppm | <1 ppm |
| Liquid L6 leaving the condenser | 17 | −24 | ~100% | 1 ppm | <1 ppm | <1 ppm |
| Gas G9 recirculated from the reboiler to the distillation column | 17 | −24 | ~100% | 3 ppm | <1 ppm | <1 ppm |
| Liquid L7 leaving the reboiler | 17 | −24 | 100% | <1 ppm | <1 ppm | <1 ppm |

The gas G1 fed to the plant is a flue gas comprising 11% $CO_2$, 3.4% $O_2$, 3 ppm $NO_2$, and 100 ppm NO. This gas enters the absorption column A1 at a temperature of 47° C. and a pressure of 1.02 bar. The other main components in the feeding gas are 76.6% $N_2$, and 7.6% $H_2O$.

In the absorption column A1, the feeding gas G1 is mixed with the liquid L5, which is recycled from the stripper column A2. As the absorbing agent an aqueous solution of monoethanolamine is used. The gas stream G2 leaving the absorption column A1 has a temperature of 43° C. and a pressure of 1.02 bar, and comprises 600 ppm $CO_2$, 3.8% $O_2$, <1 ppm $NO_2$, and 115 ppm NO. Another major component is $N_2$, which is present in the gas G2 at 87%.

The liquid stream L1 leaving the absorption column A1 comprises the aqueous solution of monoethanolamine, in which the contents of $O_2$, $NO_2$ and NO are <1 ppm. When leaving the absorption column A1, the liquid stream L1 has a temperature of 48° C. and a pressure of 1.02 bar. However, before entering the flash column A3 as the liquid L2 the temperature is increased to 95° C. and the pressure is increased to 3 bar.

In the flash column A3 the liquid L2 is separated into a gas stream G3 and a liquid stream, which both are leaving the flash column A3 at a temperature of 94° C. and a pressure of 1.3 bar. The gas G3 leaving the flash column A3 comprises 38% $CO_2$, 420 ppm $O_2$, and 110 ppm NO. The content of $NO_2$ in G3 is <1 ppm. Other components, such as $H_2O$, oxygenates as for example acetaldehyde, volatile organics, and argon, are also present in the gas G3. In the specific embodiment shown in FIG. 1, the gas stream G3 is recycled to the absorption column A1. The main component of the liquid leaving the flash column A3 is the aqueous solution of monoethanolamine.

The pressure of the liquid stream leaving the flash column A3 is then increased to 3 bar just before entering the stripper column A2.

In the stripper A2 the liquid L3 is separated into a gas stream and a liquid stream. The liquid stream L4 has a temperature of 112° C. and a pressure of 2 bar, and the content of $CO_2$ is 0.6 ppm, whereas the contents of $O_2$, $NO_2$, and NO are <1 ppm. In the embodiment shown in FIG. 1, the liquid stream L4 is recycled to the absorption column A1 as the liquid stream L5. However, before entering the absorption column A1 the temperature of the liquid stream L5 is decreased to 63° C.

The gas stream, which leaves the stripper, is then cooled to a temperature of 45° C. In the shown embodiment part of the gas (mostly gaseous water) is condensed during the cooling step, and said condensed liquid is recycled and mixed with the liquid stream, which is to enter the flash column A3. The part of the condensed gas, which is not condensed (that is the gas G4), is subsequently entering the washing column A4 at a temperature of 45° C. and a pressure of 1.2 bar. Furthermore, the content of the interesting chemical components in this stream constitutes 92% $CO_2$ and 1 ppm $O_2$, whereas the contents of $NO_2$ and NO are <1 ppm.

The gas G5 leaves the washing column A4 at the same temperature and pressure as when entering said column. Furthermore, the content of $CO_2$ and $O_2$ also remains unchanged. Afterwards the pressure of this gas is increased to 17 bar and the temperature is decreased to 20° C. before the gas G6 enters the dehydrator A5. When entering the dehydrator A5 the gas G6 contains 99.9% $CO_2$ and 1 ppm $O_2$. In the dehydrator A5 the traces of water, oxygenates and volatile organics are removed. Therefore, when the gas G7 leaves the dehydrator A5 the content of $CO_2$ has increased to ~100%. The temperature and the pressure of the gas do not change during the dehydration.

Hence, the gas G7 enters the condenser A8 at a temperature of 20° C., a pressure of 17 bar, and a content of $CO_2$ and $O_2$ of ~100% and 1 ppm, respectively. The gas G8, which is discharged from the condenser comprises ~100% of $CO_2$ and 20 ppm $O_2$. The contents of $NO_2$ and NO in this gas stream are <1 ppm.

The liquid L6 leaving the condenser A6 is then led into a distillation column A7 at a temperature of −24° C. and a pressure of 17 bar. In the specific embodiment shown in FIG. 1 the distillation column A7 is connected with a reboiler A8 in order to improve the purity of the liquid product $CO_2$ L7. In this configuration a gas G9 comprising ~100% $CO_2$ and 3 ppm $O_2$ is recycled from the reboiler A9 to the distillation column A8. The product stream L7 leaves the plant at a temperature of −24° C. and a pressure of 17 bar. The content of $CO_2$ is expressed as 100% as this stream only contains traces of $O_2$ (<1 ppm) and $N_2$ (<[1] ppm).

COMPARATIVE EXAMPLE

In comparison a traditional plant is described below. This plant is identical to the plant according to the present invention with the exception that no flash column is placed between the absorption column and the stripper column. Data with respect to pressure and temperature as well as the chemical composition of the interesting gas and liquid streams for a conventional plant are given in the table below. All references to pressures are to the total pressure. All percentages and ppm specifications are based on mole fractions. For the data relating to the gas streams, the data specified are based on wet gases.

TABLE 2

Pressure, temperature and chemical composition of selected gas and liquid streams for the conventional plant, in which no flash column is included.

| | Pressure (bar) | Temp. (° C.) | $CO_2$ mole | $O_2$ mole | $NO_2$ mole | NO mole |
|---|---|---|---|---|---|---|
| Gas G1 entering the absorption column | 1.02 | 47 | 11% | 3.4% | 3 ppm | 100 ppm |
| Gas G2 leaving the absorption column | 1.02 | 44 | 640 ppm | 3.8% | <1 ppm | 112 ppm |
| Liquid L1 leaving the absorption column | 1.02 | 48 | 1.4% | <1 ppm | <1 ppm | <1 ppm |
| Liquid L2 entering the stripper column | 3 | 95 | 1.3% | <1 ppm | <1 ppm | <1 ppm |
| Liquid L4 after the stripper | 2 | 112 | 0.6% | <1 ppm | <1 ppm | <1 ppm |
| Liquid L5 before the absorption column | 2 | 63 | 0.6% | <1 ppm | <1 ppm | <1 ppm |
| Gas G4 leaving the stripper after cooling | 1.2 | 45 | 92% | 65 ppm | <1 ppm | 20 ppm |
| Gas G5 leaving the washing column | 1.2 | 45 | 92% | 65 ppm | <1 ppm | 20 ppm |
| Gas G6 entering the dehydrator | 17 | 20 | 99.8% | 70 ppm | <1 ppm | 20 ppm |
| Gas G7 entering the condenser | 17 | 20 | 99.9% | 70 ppm | <1 ppm | 20 ppm |
| Gas G8 leaving the condenser | 17 | −25 | 98.0% | 1250 ppm | <1 ppm | 20 ppm |
| Liquid L6 leaving the condenser | 17 | −25 | 99.9% | 90 ppm | 20 ppm | 1 ppm |
| Gas G9 recirculated from the reboiler to the distillation column | 17 | −24 | 99.9% | 180 ppm | <1 ppm | 2 ppm |
| Liquid L7 leaving the reboiler | 17 | −24 | ~100% | 12 ppm | 20 ppm | <1 ppm |

In the conventional plant the gas G1 fed to the plant is a flue gas comprising 11% $CO_2$, 3.4% $O_2$, 3 ppm $NO_2$, and 100 ppm NO. This gas enters the absorption column A1 at a temperature of 47° C. and a pressure of 1.02 bar. The other main components in the feeding gas are 76.6% $N_2$, and 7.6% $H_2O$. Hence, the feeding gas is identical to the feeding gas used to describe the plant according to the present invention.

In the absorption column A1, the feeding gas G1 is mixed with the liquid L5, which is recycled from the stripper column A2. As the absorbing agent an aqueous solution of monoethanolamine is used. The gas stream G2 leaving the absorption column A1 has a temperature of 44° C. and a pressure of 1.02 bar, and comprises 640 ppm $CO_2$, 3.8% $O_2$, <1 ppm $NO_2$, and 112 ppm NO.

The liquid stream L1 leaving the absorption column A1 comprises the aqueous solution of monoethanolamine. The contents of $O_2$, $NO_2$ and NO are <1 ppm. When leaving the absorption column A1, the liquid stream L1 has a temperature of 48° C. and a pressure of 1.02 bar. This liquid is led to the stripper column A2. However, before entering the stripper column A2 as the liquid L2 the temperature is increased to 95° C. and the pressure is increased to 3 bar.

In the stripper A2 the liquid L2 is separated into a gas stream and a liquid stream. The liquid stream L4 has a temperature of 112° C. and a pressure of 2 bar, and the content of $CO_2$ is 0.6 ppm, whereas the contents of $O_2$, $NO_2$, and NO are <1 ppm. In the embodiment shown in FIG. 2, the liquid stream L4 is recycled to the absorption column A1 as the liquid stream L5. However, before entering the absorption column A1 the temperature of the liquid stream L5 is decreased to 63° C.

The gas stream, which leaves the stripper, is then cooled to a temperature of 45° C. In the shown embodiment part of the gas (mostly gaseous water) is condensed during the cooling step, and said condensed liquid is recycled and mixed with the liquid stream, which is to enter the stripper column A2. The part of the condensed gas, which is not condensed (that is the gas G4), is subsequently entering the washing column A4 at a temperature of 45° C. and a pressure of 1.2 bar. Furthermore, the content of the interesting chemical components in this stream constitutes 92% $CO_2$, 65 ppm $O_2$, and 20 ppm NO. The content of $NO_2$ is <1 ppm.

The gas G5 leaves the washing column A4 at the same temperature and pressure as when entering said column. Furthermore, the contents of $CO_2$, $O_2$, and NO also remain unchanged. Afterwards the pressure of this gas is increased to 17 bar and the temperature is decreased to 20° C. before the gas G6 enters the dehydrator A5. When entering the dehydrator A5 the gas G6 contains 99.8% $CO_2$, 70 ppm $O_2$, and 20 ppm NO. In the dehydrator A5 the traces of water, oxygenates and volatile organics are removed. When the gas G7 leaves the dehydrator A5 the content of $CO_2$ has increased to 99.9%, whereas the content of $O_2$ and NO is unchanged. The temperature and the pressure of the gas do not change during the dehydration.

Hence, the gas G7 enters the condenser A8 at a temperature of 20° C., a pressure of 17 bar, and a content of $CO_2$, $O_2$, and NO of 99.9%, 70 ppm and 20 ppm, respectively. The gas G8, which is discharged from the condenser comprises 98.0% of $CO_2$, 1250 ppm $O_2$, <1 ppm $NO_2$, and 20 ppm NO.

The liquid L6 leaving the condenser A6 is then led into a distillation column A7 at a temperature of −25° C. and a pressure of 17 bar. In the specific embodiment shown in FIG. 2 the distillation column A7 is connected with a reboiler A8 in order to improve the purity of the liquid product $CO_2$ L7. In this configuration a gas G9 comprising 99.9% $CO_2$, 180 ppm $O_2$, <1 ppm $NO_2$, and 2 ppm NO is recycled from the reboiler A9 to the distillation column A8. The product stream L7 leaves the plant at a temperature of −24° C. and a pressure of 17 bar. The content of $CO_2$ is expressed as ~100% as this stream also contains contaminants such as 12 ppm of $O_2$, 20 ppm $NO_2$, and <1 ppm NO.

When these data is compared with the data relating to the method according to the present invention it is clear that the contents of contaminants are markedly higher for the plant, in which no flash column is incorporated. For comparison it is well known that food grade $CO_2$ specifications typically state a maximum of 2.5 ppm NO and 2.5 ppm $NO_2$.

The invention claimed is:

1. A method for recovery of high purity carbon dioxide from a gaseous source comprising the steps of:
   a. feeding a gas (G1) comprising at least carbon dioxide, oxygen, $N_2$, and nitrogen oxides, into an absorption column (A1),
   b. absorbing the gas (G1) in an absorbing agent, by which the gas (G1) is separated into a carbon dioxide-lean gas (G2) and a carbon dioxide-rich liquid (L1),
   c. pressurising and heating the liquid (L1) obtained in step b in order to provide the liquid (L2),
   d. separating by flashing in a flash column (A3) the liquid (L2) obtained in step c into a $N_2$-, $NO_x$-, and oxygen-rich gas (G3) and a $N_2$-, $NO_x$-, and oxygen-depleted liquid leaving the flash column (A3),
   e. pressurising the liquid leaving the flash column (A3) in step d in order to provide the liquid (L3),
   f. separating the liquid (L3) obtained in step e into a carbon dioxide-rich stripper off gas and a carbon dioxide-depleted liquid (L4) by stripping in a stripper column (A2),
   g. cooling the stripper off gas obtained in step f in order to provide a cooled gas (G4).

2. The method according to claim 1, wherein the temperature of the liquid (L2) obtained in step c is in the range of 70° C. to 140° C. and the pressure of said liquid (L2) is in the range of 0.1 bar to 3 bar.

3. The method according to claim 1, wherein the feeding gas (G1) is flue gas.

4. The method according to claim 1, wherein the absorbing agent is an amine-based absorbing agent.

5. The method according to claim 1, wherein the liquid (L4) obtained in step f is recycled and mixed with the absorbing agent used for absorbing the gas (G1) in step b.

6. The method according to claim 1, wherein the gas (G3) obtained in step d is recycled to the absorption step b.

7. The method according to claim 1, wherein a part of the stripper off gas is liquefied in step g and recycled to the flash column (A3).

8. The method according to claim 1, wherein the gas G4 obtained in step g is subjected to a further step j of dehydrating the gas (G4) obtained in step g by a dehydrator and thereby providing a dry gas (G7) substantially free of water, oxygenates, and volatile organics.

9. The method according to claim 8, wherein the gas G4 obtained in step g prior to step j is subjected to the further steps of h washing the gas (G4) obtained in step g by a washing column in order to produce a gas (G5) substantially free of soluble contaminants and i pressurising and cooling the gas (G5) obtained in step h in order to provide the gas (G6).

10. The method according to claim 1, wherein the gas G4 is separated into a gaseous mixture of carbon dioxide rich liquid (L6) and non-condensable gases (G8) by a condenser and is further subjected to the step of I distilling the carbon dioxide rich liquid (L6) in a distillation column (A7) in order to produce liquid high purity carbon dioxide (L7), which is substantially free of nitrogen oxides, sulphurous compounds and volatile organic compounds.

11. The method according to claim 10, wherein the liquid (L7) is produced by passing the liquid leaving the distillation column (A7) through a reboiler (A8).

12. A method for recovery of high purity carbon dioxide from a gaseous source in accordance with claim 1, further comprising the steps of:
   i. pressurising and cooling the gas obtained in step g in order to provide pressurised and cooled gas,
   j. dehydrating the gas obtained in step i by a dehydrator and thereby providing a dry gas substantially free of water, oxygenates including acetaldehyde and traces of methanol, and volatile organics.

13. The method according to claim 12, wherein the gas further comprises sulphurous compounds and volatile organic contaminants.

14. The method according to claim 1 for the production of high purity carbon dioxide.

15. In a method using carbon dioxide as a component in a foodstuff or in enhanced oil recovery or in sequestration, the improvement wherein said carbon dioxide is the gas obtained in step j of claim 8.

16. The method according to claim 1, wherein the temperature of the liquid (L2) obtained in step c is in the range of 90° C. to 120° C., and the pressure of said liquid (L2) is in the range of 0.2 to 2 bar.

17. The method according to claim 1, wherein the temperature of the liquid (L2) obtained in step c is in the range of 95° C. to 110° C., and the pressure of said liquid (L2) is in the range of 1 bar to 2 bar.

18. The method according to claim 8, wherein the gas G7 is separated into a gaseous mixture of carbon dioxide rich liquid (L6) and non-condensable gases (G8) by a condenser and is further subjected to the step of I distilling the carbon dioxide rich liquid (L6) in a distillation column (A7) in order to produce liquid high purity carbon dioxide (L7), which is substantially free of nitrogen oxides, sulphurous compounds and volatile organic compounds.

19. The method according to claim 9, wherein the gas G5 is separated into a gaseous mixture of carbon dioxide rich liquid (L6) and non-condensable gases (G8) by a condenser and is further subjected to the step of I distilling the carbon dioxide rich liquid (L6) in a distillation column (A7) in order to produce liquid high purity carbon dioxide (L7), which is substantially free of nitrogen oxides, sulphurous compounds and volatile organic compounds.

* * * * *